United States Patent
Guillet et al.

[11] Patent Number: 5,967,137
[45] Date of Patent: Oct. 19, 1999

[54] HIGH EFFICIENCY DIRECT-CONTACT HIGH TEMPERATURE WATER HEATER

[75] Inventors: Rémi Pierre Guillet, Pierrefitte, France; Luc Mandeville, Terrebonne, Canada; Pascal Bocherel, Montreal, Canada; Stéphane Brunet, St-Laurent, Canada; Georges Vabre, Croissy sur Seine; Daniel Billy, Paris, both of France

[73] Assignees: Société en Commandite Gaz Métropolitain; SOFAME, both of Montreal, Canada; The Brooklyn Union Gas Company, Brooklyn, N.Y.; Chaudiére Seccacier, Paris; Gaz de France, Laplaine St-Denis, both of France

[21] Appl. No.: 08/949,556

[22] Filed: Oct. 14, 1997

[30] Foreign Application Priority Data

Mar. 27, 1997 [CA] Canada ................................. 2201259

[51] Int. Cl.⁶ ............................. F24H 1/10; F22B 37/00
[52] U.S. Cl. ................................ 126/360 A; 126/360 R; 122/5.52; 261/17
[58] Field of Search ................................. 126/355, 360 R, 126/360 A, 359, 350 B, 350 R; 431/4; 122/5.52; 261/17

[56] References Cited

U.S. PATENT DOCUMENTS 5,769,067 6/1998 Mandeville et al. ..................... 126/113

OTHER PUBLICATIONS

WO 83/00210, WOOD, Jan. 1983.

*Primary Examiner*—Carl D. Price
*Attorney, Agent, or Firm*—Swabey, Ogilvy and Renault; Guy Houle

[57] ABSTRACT

A gas-fired direct-contact water heater system 10 is described. It consists of a first housing 11, 50, 80 having a packing 16, 51, 81 of heat exchange elements 17 and on which water is sprayed. A burner 18, 52, 83 is disposed on the side of the housing under the packing. A combustible gas feed pipe is connected to the burner 18, 52, 83 to provide a combustible gas to the burner. A water collection reservoir 20, 58, 86 is defined below the burner for collecting heated water. A further packing 31-59-91 having heat exchange elements is located in a further housing 30-60-90 and it is also sprayed water. Ambient air is admitted under this packing by a blower 32-63-101 whereby the air is humidified and heated and supplied to the burner for admixture with the gas whereby to obtain a higher combustion product dew point and a reduction in the $NO_x$ emission when burned. A further water collecting reservoir 35, 62-93 is defined in the second housing 30-60-90 below the packing 31, 59, 91 for collecting water percolated through the further packing. Heated water is convected through a first conduit 36, 69, 107 from the water collection reservoir 35, 62, 93 in the first housing. A further conduit 36, 76', 99 is also provided for convecting water from the further housing. The flue gases from the first packing are also cooled in a third packing before being released to atmosphere.

27 Claims, 3 Drawing Sheets

HIGH EFFICIENCY DIRECT-CONTACT HIGH TEMPERATURE WATER HEATER

TECHNICAL FIELD

The present invention relates to an ultra-low $NO_x$ and high efficiency direct-contact water heater wherein the flue gases leaving the heater housing are further cooled by a secondary packing to extract further sensible and latent heat therefrom and wherein the combustible air is preheated and humidified in a third packing prior to admixture with natural gas thereby substantially reducing $NO_x$ emission while improving thermal efficiency to get the fuel gross calorific value.

BACKGROUND ART

Reference is made to French Patent No. 81 12770 published on Jun. 29, 1981 and relating to a system for treating flue gases from gas fired burners and No. 88 11 651 published on Sep. 6, 1988 and relating to the concept used on direct contact heaters. This is considered to be the closest prior art and it teaches an arrangement of a second and a third packing section within a system which operates as a water vapor pump for the treatment of exhaust flue gases at the outlet of a boiler and for the further treatment of combustion air at the entrance of the boiler. The system described relates to the exchange of heat and condensate for humidifying drying and heating cooling gases by an exchange system.

SUMMARY OF INVENTION

There is a need to further reduce the $NO_x$ emission, substantially, of gas-fired water heaters by improving on its design.

There is a need to further improve the thermal efficiency by raising the combustion products dew point.

It is a feature of the present invention to provide a gas-fired direct-contact water heater having improved $NO_x$ emissionreduction in and wherein a secondary packing is disposed downstream of the exhaust flue of the main burner housing to further cool the temperature of the exhaust gas and to use, in a closed circuit, the heated water produced through the secondary packing to preheat and humidify ambient air to be used in an admixture with natural gas to feed the burner.

Another feature of the present invention is to provide a third packing in a burner air feed column and to spray the third packing with the heated water collected from the secondary packing to preheat and humidify the ambient air while obtaining a substantial reduction of $NO_x$ emission in the range of about 5 to 10 ppm at 3% $O_2$ and a significant combustion product dew point increasing.

According to the above features, from a broad aspect, the present invention provides a gas-fired direct-contact water heater system comprising a first housing having a circumferential side wall, a closed bottom end wall, and a flue connected to a top end portion thereof. A water discharge device is disposed in the housing and associated with a first packing having heat exchange elements. A burner is secured to the side wall of the first housing under the first packing. A combustible gas feed pipe is connected to the burner to provide a combustible gas to the burner. A combustion air feed conduit is connected to the burner. A water collection reservoir is provided below the burner for collecting heated water. A further packing is provided and has heat exchange elements located in a further housing. A further water discharge device is spaced above the further packing to provide a source of humid air for admixture with the combustible gas to get a higher combustion product dew point and to reduce $NO_x$ emission when burned. A further water collection reservoir is provided in the further housing below the further packing for collecting water percolated through the further packing. A first conduit is provided for convecting heated water from the water collection reservoir in the first housing. A further conduit is provided for convecting water from the further housing.

BRIEF DESCRIPTION OF DRAWINGS

A preferred embodiment of the present invention will now be described with reference to the accompanying drawings in which.

DESCRIPTION OF PREFERRED EMBODIMENTS

Figure 1:
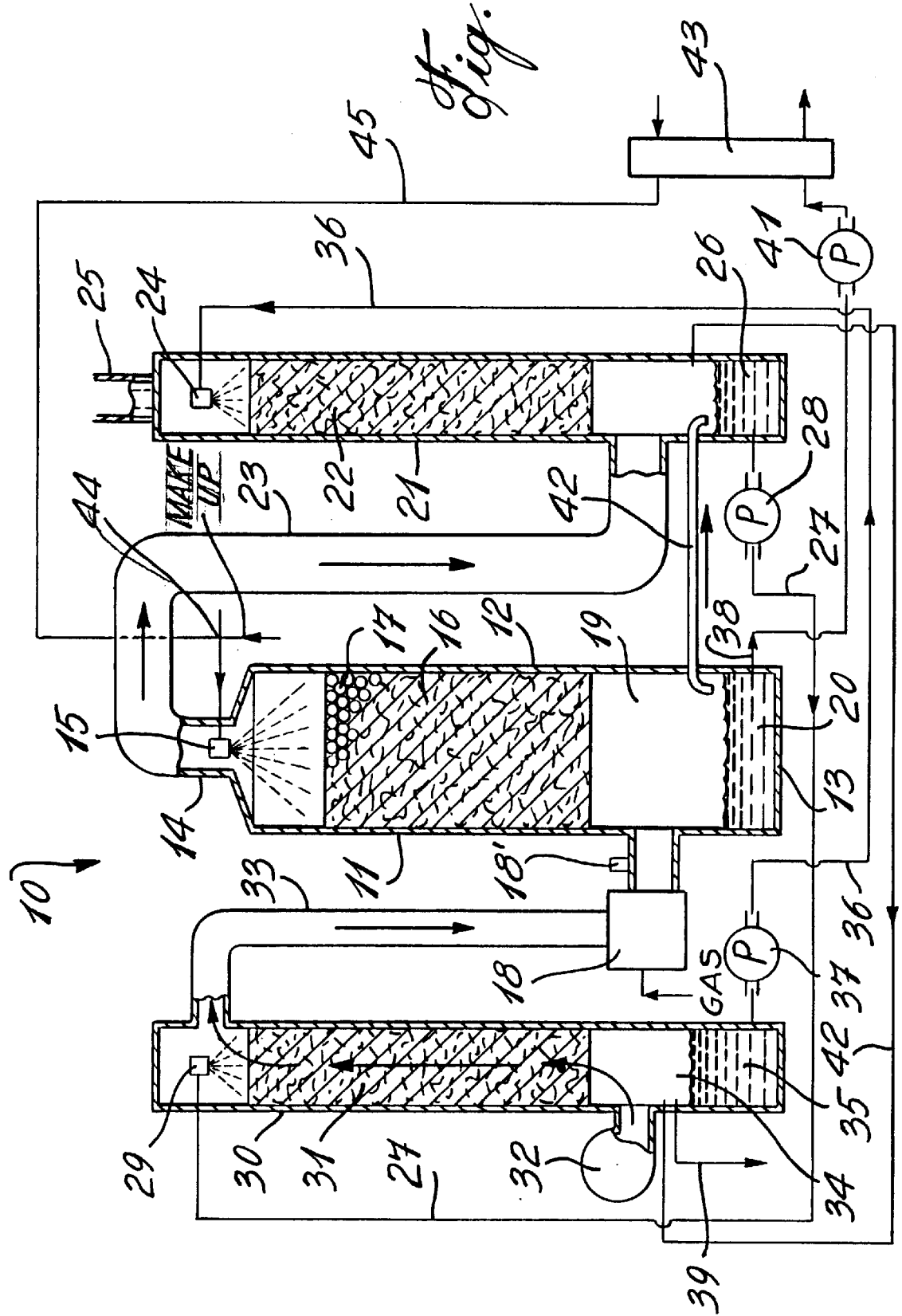
FIG. 1 is a simplified schematic diagram of an ultra-low $NO_x$ and high efficiency direct contact water heater system constructed in accordance with the present invention.

Referring now to the drawings, and more particularly to FIG. 1, there is shown generally at 10 an embodiment of the gas-fired direct contact water heater system of the present invention. The system 10 comprises a direct-contact water heating furnace 11 comprised of a vertical elongated housing 12 defining a circumferential side wall provided with a bottom end wall 13 and having a central restricted opening at a top end thereof defining an outlet flue and through which flue gases are exhausted as will be described later. Water discharge means in the form of a spray nozzle 15 is disposed in the housing and spaced above a main packing 16 of heat exchange bodies 17 which may be hollow cylindrical metal pieces, as is well known in the art.

A gas burner 18 is connected to the side wall of the cylindrical housing 12 below the packing 16 and directs a flame in the combustion chamber 19 below the packing. This burner 18 is preferably equipped with a pilot nozzle 18' supplied with combustible gas, and such as natural gas, and fresh air whereby to prevent the flame of the burner from extinguishing due to the utilization of air saturated with water in admixture with the gas. A water collecting means or reservoir 20 is defined in a bottom end portion of the housing 12 to collect heated water which is obtained from the spray nozzle 15 and heated as it fall through the housing 12 and percolates through the packing 16 which is heated by the flame and the flue gases as they rise through the packing.

A secondary cylindrical housing 21 is provided with a secondary packing 22 of heat exchange bodies through which hot combustion gases from the outlet flue 14 are directed from under the secondary packing 22 by an interconnecting conduit 23. These outflow gases are cooled by cold water sprayed onto the secondary packing by a further water spray nozzle 24 disposed above the secondary packing. As the water and packing cools, the hot flue gases rise through the secondary packing 22 and exit through the exhaust flue 25. The water is heated and accumulated in a further water collecting means or reservoir 26 formed by a bottom portion of the secondary cylindrical housing 21. The gases released through the flue 25 have also been considerably cooled and this increases the efficiency of the system.

The heated water from the reservoir 26 of the secondary cylindrical housing 21 is then pumped by pump 28 through a conduit 27 to a combustible air treatment means 30 comprised by a third cylindrical housing 30 which contains a still further packing 31 of heat exchange bodies and having a third spray nozzle 29 disposed there above. At the bottom of this third packing, a blower 32 is connected whereby to introduce ambient air under the third packing whereby to supply ambient air to the burner. As the ambient air rises through the third packing it is heated and humidified by the hot water which is collected in the reservoir 26 of the secondary housing and sprayed over the third packing 31 by spray nozzle 29. This hot humid air is fed to the burner 18 via the air feed pipe 33. This increases the combustion product dew point and reduces the $NO_x$ emission of the burner to about 6 to 8 parts per million at 3% $O_2$.

As water from the spray nozzle 29 percolates through the third packing 31, it is cooled by the ambient air introduced in the chamber 34 which rises through the packing. This cooled water is collected in a third reservoir 35 formed in a bottom portion of the cylindrical housing 30 and it constitutes the supply of cool water to feed the second water nozzle 24 in the second housing 21. As shown, a feed pipe 36 and pump 37 provide the interconnecting flow path between the third reservoir 35 and the spray nozzle 24. A conduit 42 also interconnects the reservoir 26 of the secondary housing 21 to the main water reservoir 20 of the burner housing 11 to direct condensate from the reservoir 20 into the reservoir 26. A conduit 42' also interconnects the reservoir 26 to the reservoir 35 to allow one only overflow located in the reservoir 35. Feed pipe 38 supplies the hot water for domestic or commercial use. This hot water may also be directed by pump 41 through a heat exchanger 43, although many heat exchangers could be interconnected in series. The make-up water pipe 44 connected to the spray nozzle 15 may also be supplied return water from the circuit 45 connected to the heat exchanger 43, as herein shown. Condensate from the reservoir 35 is also collected via an overflow pipe 39.

Figure 2:
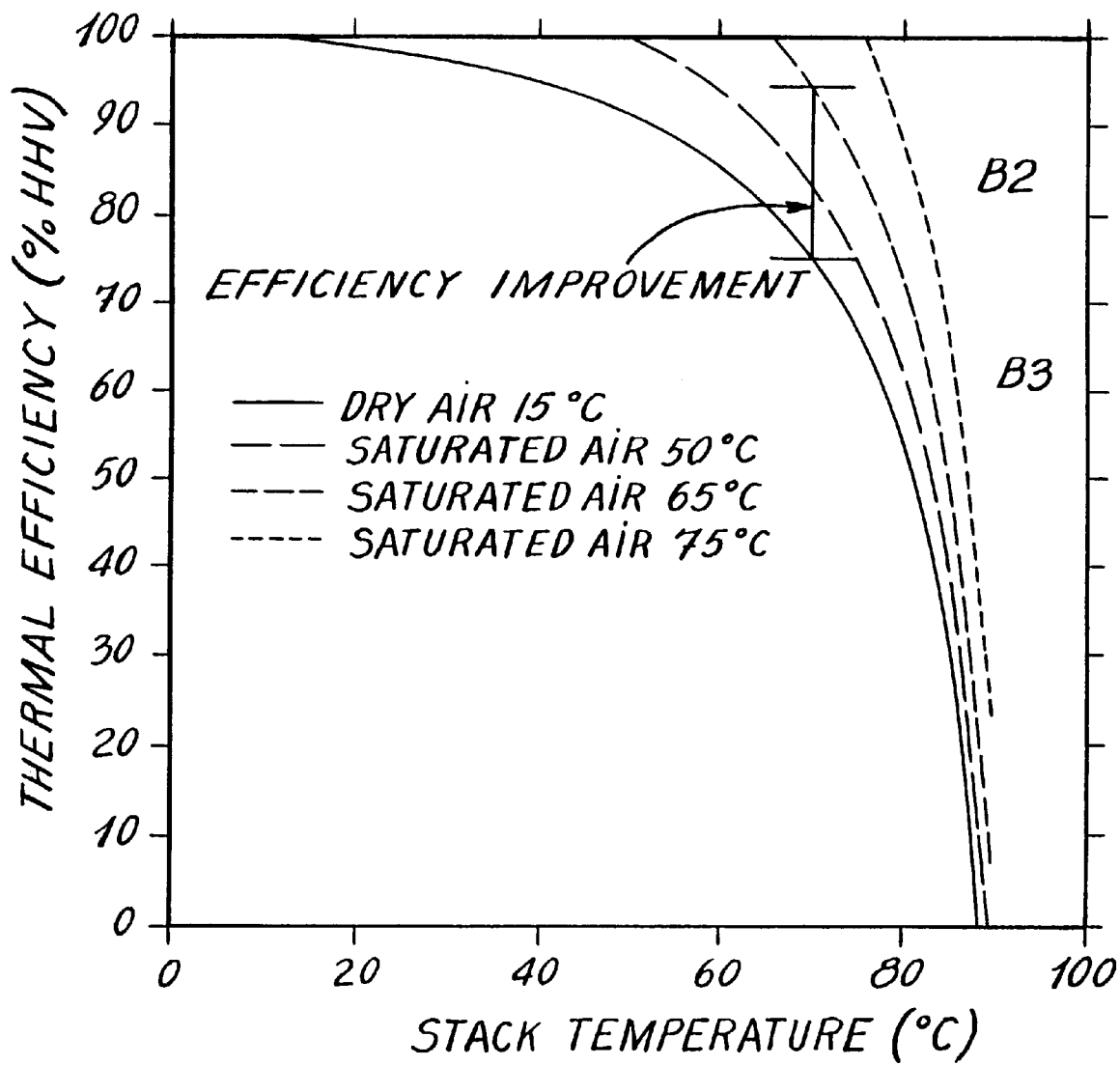
FIG. 2 is a hygrometry diagram of combustion products showing the efficiency obtained with the gas-fired direct-contact water heater system of the present invention.

FIG. 2 is an hygrometric diagram of combustion products applied to direct contact water heaters. This graph shows the value of thermal efficiency (% HHV) as a function of stack temperature. For direct contact water heaters the stack temperature is about 5° C. above the inlet water temperature. Curve A shows that when stack gases are above 60° C., the efficiency of the system decreases drastically due to the evaporation of the water to be heated. Curves B1, B2 and B3 show the effect that humidified combustion air as on the thermal efficiency of the system when air is saturated at different temperatures. As an example, for a stack temperature of 80° C., thermal efficiency of a direct contact water heater, using a water vapor air supply system as described herein, can be improved from about 64% to 84% when saturated air at 65° C. is used for combustion.

Improvement of thermal efficiency is caused by the recuperation of the latent heat of combustion product. Water vapor introduced in combustion air reduces the flame temperature and has an effect on combustion chemistry and induce a reduction of $NO_x$ formation.

For standard application, when the inlet water temperature in a direct contact water heater is about 60° C., a lot of water is lost by evaporation. In this condition, the hardness of the water increases and a water treatment unit could be required for the make-up water. For some operating condition, the use of a water vapor pump reduces the quantity of make-up water and no water treatment unit is required.

The gas-fired direct contact water heater system as shown in FIG. 1 was constructed to the following specifications. The water heater 12 has a diameter of 18 inches with the packing 16 extending for a distance of about 3 feet. The $\Delta_p$ of the heater housing was about 2 inches. The housings 22 and 30 which may be considered to be a condenser and evaporator housing, are substantially identical in construction and their housing has a diameter of 12 inches along a height of 8 feet. The main packing extends approximately 4 feet therein and the housing produced a $\Delta_p$ of 1.8 inches. The water circulation through these housings 21 and 30 is approximately 25 U.S. gallons per minute through conduits 27 and 36 which are approximately 1¼" inch conduits. The pressure provided by the pumps 28 and 37 was about 35 feet and this is based on a 10 psi pressure at the nozzles 24 and 29.

Figure 3:
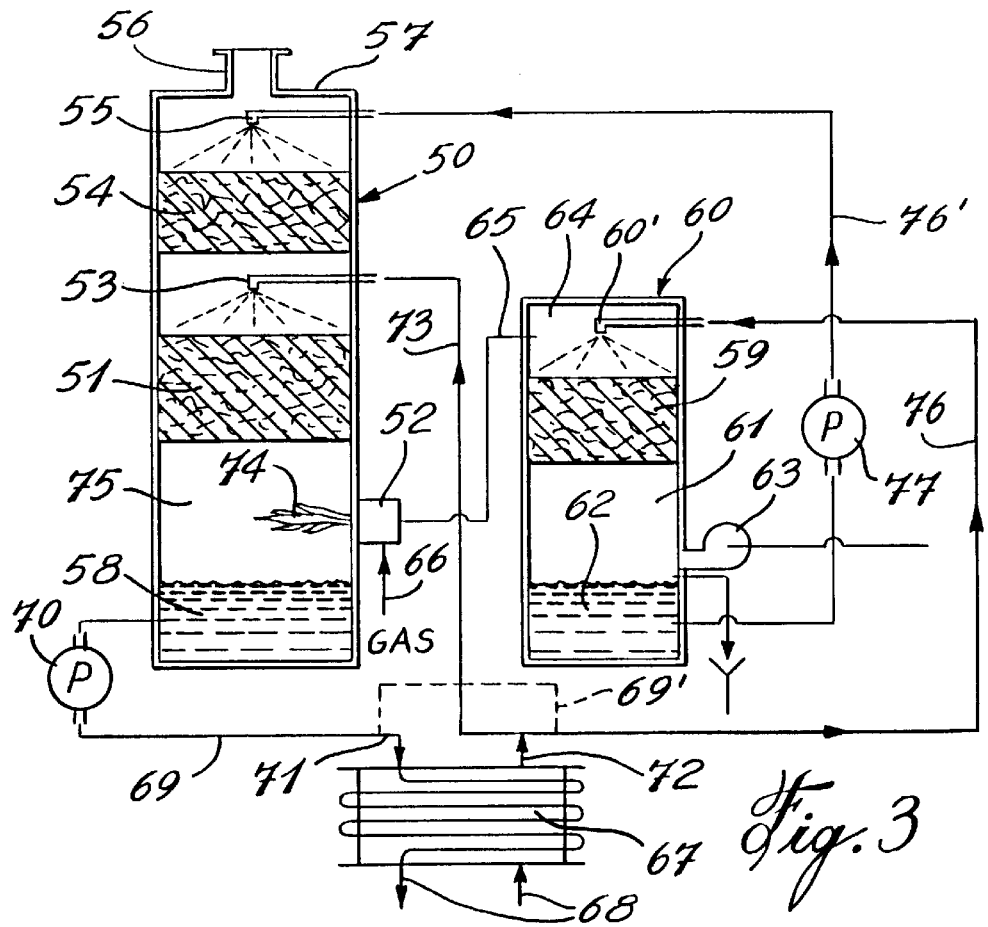
FIG. 3 is a further simplified schematic diagram of a further embodiment of the high efficiency water heater system.

Referring now to FIG. 3, there is shown a second embodiment of the present invention and wherein the high efficiency direct contact water heater is constructed using two housings and namely a first housing 50 and a second housing 60. A first packing of heat exchange bodies 51 is mounted in the first housing above the burner 52. A spray nozzle 53 is secured above the first packing 51 in the manner as previously described. A second packing of heat exchange bodies 54 is also secured in the housing 50 and spaced above the spray nozzle 53 to further cool the hot gases rising through the housing 50. A second spray nozzle 55 is connected above the second packing 54 and a exhaust flue 56 is secured to the top wall 57 of the housing 50. The bottom of the housing 50 defines a water collecting reservoir 58.

In the second housing 60, there is secured a third packing of heat exchange bodies 59. A third spray nozzle 60' is secured above the third packing 59. A space 61 is defined below the second packing and above the water reservoir 62 formed at the bottom of the second housing 60. An air blower 63 is connected to the space 61 to feed ambient air therein and through the third packing 59 wherein the air is preheated and humidified and connected to the burner 52 from the top chamber 64 through a convection duct 65 whereby the humid air exiting from the second housing 60 will admix with the gas sent to the burner 52 through the gas line 66. By humidifying this air, a dew point increasing and a redution $NO_x$ emission is achieved, as previously described.

As herein shown, the hot water collecting in the reservoir 58 of the first housing 50, is convected through a heat exchanger 67 or a plurality of these connected in series as indicated by arrow 68 via a feed conduit 69 in which a pump 70 is connected to circulate water through the heat exchanger 67 whereby to heat an external medium. The hot water from the reservoir 58 enters the heat exchanger 67 through an inlet 71 and exits the heat exchanger to an outlet 72 which is connected via conduit 73 to the first spray nozzle 53 above the packing 51 whereby the cooled water exiting the heat exchanger is again heated by circulating through the heat exchange bodies in the first packing 51 and by being in contact with hot rising gases and by contact with the flame 74 in the combustion housing 75 of the first housing 50.

The spray nozzle 60' disposed above the third packing 59 is also connected to the outlet 72 of the heat exchanger 67 through a conduit 76 and the water in the conduit, although cooled, may be at a temperature sufficient to heat and humidify the ambient air fed into the chamber 61 by the blower 63. The water cumulating in the reservoir 62 feeds the second spray nozzle 55 via a feed circuit which consists of conduit 76' and pump 77. It is pointed out that the spray nozzle 60' may also be connected directly to the feed line 69 from the reservoir 58 (see phantom circuit 69') which feeds the inlet of the heat exchanger 71 to provide hottest water to humidify the ambient air fed for admixture with the gas in the burner 52. It can thus be seen that the system configuration as described and illustrated in FIG. 3, provides another arrangement whereby to achieve the desirable results of the present invention and herein by utilizing only two elongated cylindrical vertical housing 50 and 60.

Figure 4:
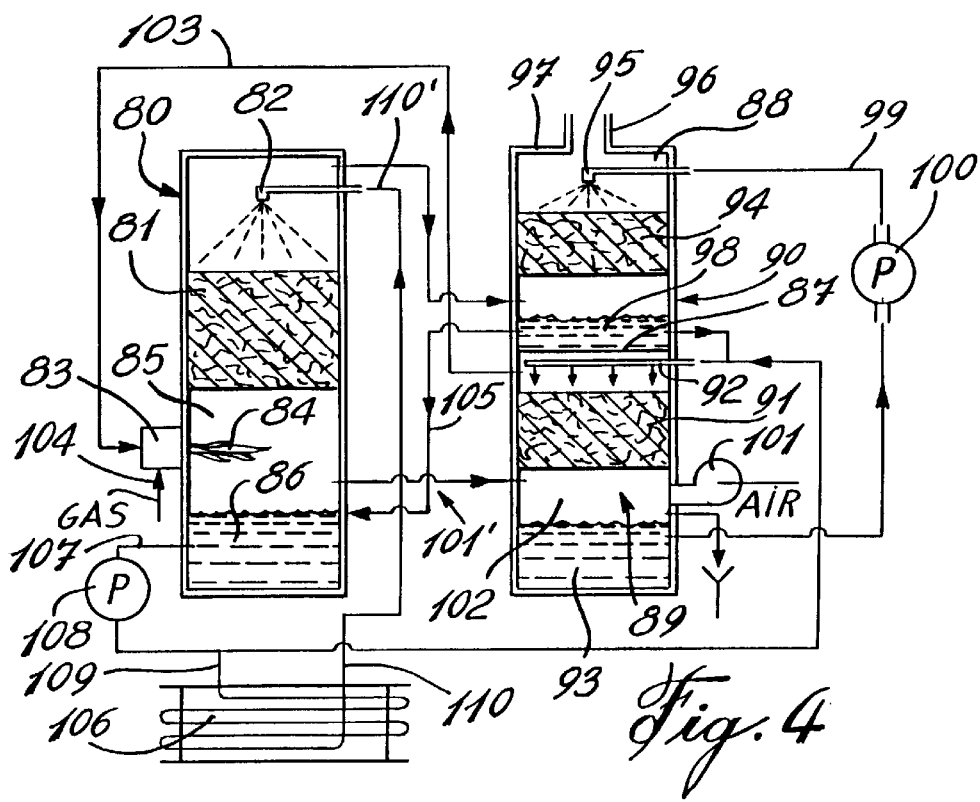
FIG. 4 is a still further simplified schematic diagram of a still further embodiment of the high efficiency water heater system of the present invention.

Referring now to FIG. 4, there is shown a still further embodiment of the present invention. As herein shown, there is again provided only two housings and namely a first housing 80 and a second housing 90. The first housing 80 is provided with a single packing 81 of heat exchange bodies and above which a spray nozzle 82 is secured. A burner 83 is connected to a side wall of the housing 80 and feeds a hot flame 84 in the combustion chamber 85 therein. A water accumulating reservoir 86 is defined in the bottom end of the housing 80.

The second housing 90 is divided in two sections by a dividing wall 87 to define an upper chamber 88 and a lower chamber 89. The third packing 91 of heat exchange bodies is secured inside the lower chamber 89 and above which is connected a spray device 92. The third second water collecting reservoir 93 is defined in a lower portion of the lower chamber.

In the upper chamber 88, the second packing 94 of heat exchange bodies is also provided and above which a second spray nozzle 95 is secured whereby to spray water thereover for cooling hot combustion product to exhaust through the exhaust flue 96 secured to the top wall 97 of the housing 90. A water collecting reservoir 98 is defined below the second packing 94 and above the division wall 87. As herein shown the spray nozzle 95 is supplied water from the third reservoir 93 in the lower chamber 89 through a feed circuit which is comprised of conduit 99 and pump 100.

An air blower 101 supplies ambient air in the chamber 102 defined below the third packing 91 and the third water reservoir 93. This air rises through the packing 91 and is heated and humidified by the heated water which is dispensed through the spray device 92 and the heat exchange bodies 91 and the packing. This hot humid air is then convected through conduit 103 to the burner 83 where it is mixed with the gas fed there through, through gas line 104 to increase the combustion product dew point and reduce the $NO_x$ emission produced by the burner flame 84 as previously described. As also previously described, the second reservoir 98 may also be connected through conduit 105 to the first reservoir 86 in the first housing 80. This is an optional feature if the second reservoir does not feed the spray device 92 in the lower chamber of the second housing.

The spray device 92 in the lower chamber of the second housing may also be supplied hot water from a heat exchanger 106 which is herein shown connected to the first reservoir 86 of the first housing 80. A feed circuit consisting of conduit 107 and pump 108 feeds the inlet 109 of the heat exchanger 106. The outlet 110 of the heat exchanger is again, as previously described with the other embodiments, connected to the spray nozzle 82 secured above the first packing 81 in the first housing 80. As also previously described the spray device 92 of the third packing may also be connected to either the inlet 109 of the heat exchanger or its outlet 110. If so connected, then the conduit 105, shown in phantom line, would interconnect the third reservoir 98 to the first reservoir 86. Another pipe 107' connects reservoir 86 to reservoir 93 to allow the final overflow in the cold water reservoir 93. The outlet pipe 110' from the heat exchanger 106 feeds the spray nozzle 82.

It is within the ambit of the present invention to cover any obvious modifications of the examples of the preferred embodiment described herein, provided such modifications fall with the scope of the appended claims.

We claim:

1. A gas-fired direct-contact water heater system comprising a first housing 12 having a circumferential side wall,
    a closed bottom end wall,
    and a flue connected to a top end portion of said first housing;
    a water discharge device disposed in said housing and associated with first packing having heat exchange elements,
    a burner secured to a side wall of said first housing under said packing,
    a combustible gas feed pipe connected to said burner to provide a combustible gas to said burner,
    a combustion air feed conduit connected to said burner,
    a water collection reservoir below said burner for collecting heated water,
    a further packing having heat exchange elements located in a further housing,
    a further water discharge device spaced above said further packing to provide a source of humid air for admixture with said combustible gas to increase the combustion product dew point and to reduce $NO_x$ emission when burned,
    a further water collection reservoir in said further housing below said further packing for collecting water percolated through said further packing,
    and a first conduit for convecting heated water from said water collection reservoir in said first housing, and a further conduit for convecting water from said further housing.

2. A water heater as claimed in claim 1 wherein said first packing of said heat exchange bodies provided in interference flow with rising combustion product in said first housing, said further housing being comprised of a second and third housing, said further packing being comprised of a second and third packing of heat exchange bodies provided in interference flow respectively with the flue gases and with rising air, respectively, in said second and third housing; said further water discharge device comprises a second and third water discharge device associated with said second and third packings, respectively; said second and third housing having a second and third water collection, device respectively, below an associated of said second and third packings; said second packing being disposed downstream of said flue connected to said first housing and in interference flow with exhaust flue gases from said first housing to cool said flue gases, said third packing being disposed upstream of said combustion air feed conduit of said first housing to preheat and humidify ambient air to produce said humid air.

3. A water heater as claimed in claim 2 wherein said third water discharge device is positioned above said third packing for spraying heated water from said water collection reservoir of said second housing to cause said heated water to percolate through said third packing for heating and humidifying air convected in counterflow direction to said percolating heated water to supply said hot humid air to said burner.

4. A water heater as claimed in claim 3 wherein said water collected in said third water collection reservoir is fed to said second water discharge device by a feedback conduit circuit and a pump.

5. A water heater as claimed in claim 3 wherein said flue of said first housing is connected to said second housing under said second packing of heat exchange elements, said second water discharge device causing water to percolate through said second packing where it is heated by said exhaust flue gases and collected in said second water collection reservoir which is formed by a bottom end portion of said second housing.

6. A water heater as claimed in claim 5 wherein said hot water from said second reservoir is cooled as it percolated through said third packing and fed back to said second water discharge device through a feedback conduit circuit and a pump.

7. A water heater as claimed in claim 2 wherein said third water collection reservoir is constituted by a bottom end portion of said third housing.

8. A water heater as claimed in claim 1 wherein said flue is a restricted exhaust flue centrally disposed in a top wall of said first housing.

9. A water heater as claimed in claim 5 wherein there is further provided an overflow conduit connected between said second water collection reservoir and said third water collection reservoir to transfer overflow heated water from said second water collection reservoir to said third water collection reservoir.

10. A water heater as claimed in claim 2 wherein said air to be fed to said feed pipe is ambient air, said ambient air being heated by said third packing, said air fed to said burner being at a temperature in the range of from about 45° C. to 75° C. and substantially saturated in water vapor at this temperature, said third water discharge device being connected to a hot water supply at about 50° C. to 60° C., said heated water in said water collection reservoir of said first housing being at a temperature of about 80° C. to 90° C.

11. A water heater as claimed in claim 2 wherein said water in said third water collection reservoir below said third packing is cooled to a temperature of about 30° C. to 35° C. by said air rising through said third packing and fed to said second water discharge device by a feedback conduit circuit to be reheated by said second packing to a temperature of about 50° C. to 60° C.

12. A water heater as claimed in claim 1 wherein said preheated and humidified air is mixed with natural gas to substantially increase the combustion product dew point and lower the $NO_x$ emission of said flue gases generated by said burner, said heated water in said water collecting reservoir of said first housing being at a temperature of about 80° C. to 90° C.

13. A water heater as claimed in claim 2 wherein there is further provided a heat exchanger connected between said water collection reservoir of said first housing and said second water discharge device of said second housing, said heat exchange means extracting heat from water accumulating in said water collecting reservoir for heating purposes, and feed conduit to feed said heat exchanger and said second water discharge.

14. A water heater as claimed in claim 1 wherein said further packing is comprised of a second packing of heat exchange bodies secured in a second housing, said second housing constituting said further housing and having air convection means for convecting air through said second packing, and a conduit connected to said second housing above said second packing for supplying said humid air to said burner for admixture with said combustible gas, said further packing also comprising a third packing located in said first housing above said first packing, said further water discharge device comprising a second and third water discharge device disposed above said second and third packing, respectively; said further water collection reservoir comprising a third water collection reservoir defined in a bottom section of said second housing, and a feed conduit to supply water from said second water collection reservoir to said second water discharge device to further cool exhaust gases rising in said first housing to said flue which is an exhaust flue.

15. A water heater as claimed in claim 14 wherein said feed conduit is comprised of a pump and pipe interconnecting said bottom section of said second housing to said third water discharge device which is a spray nozzle.

16. A water heater as claimed in claim 14 wherein there is further provided a heat exchanger connected between said water collection reservoir of said first housing and said water discharge device in said first housing which is located above said first packing, said heat exchanger extracting heat from hot water accumulating in said water collection reservoir for heating purposes, and a further feed conduit to feed said heat exchanger and said water discharge device, said second water discharge device being connected to said further feed conduit at the outlet of said heat exchanger.

17. A water heater as claimed in claim 16 wherein said third water discharge device is also connected to said outlet of said heat exchanger.

18. A water heater as claimed in claim 16 wherein said third water discharge device is connected to an inlet of said heat exchanger to receive said hot water from said water collection reservoir of said first housing.

19. A water heater as claimed in claim 1 wherein said further packing is comprised of a second and third packing of heat exchange bodies secured spaced-apart and isolated from one another in a second housing, a division wall in said second housing dividing same in a lower and an upper chamber, said second housing constituting said further housing and having air displacement means connected to said lower chamber for convecting air through said third packing secured therein, said further water collection reservoir being comprised by a third water collecting reservoir in a bottom portion of said lower chamber and a second water collecting reservoir above said division wall in said upper chamber, said second packing being spaced above said second water collecting reservoir, a flue communicating with said second chamber, said further water discharge device comprising a second and third water discharge device secured in a space above said second and third packing, respectively; a feed conduit to supply water from said third water collecting reservoir to said second water discharge device, air convection means for convecting preheated humid air from said space above said third packing to said burner for admixture with said combustible gas.

20. A water heater as claimed in claim 19 wherein there is further provided an interconnecting conduit for interconnecting said second water collecting reservoir to said water collection reservoir of said first housing, said water collection reservoir of said first housing being connected to a heat exchanger through a feed conduit for extracting heat from hot water accumulating in said water collection reservoir of said first housing for heating purposes.

21. A water heater as claimed in claim 20 wherein said heat exchanger has an inlet connection connected to said water collection reservoir of said first housing and an outlet connected to said water discharge device of said first housing to supply cooled water to said water discharge device.

22. A water heater as claimed in claim 21 wherein said third water discharge device is connected to said outlet of said heat exchanger.

23. A water heater as claimed in claim 21 wherein said third water discharge device is connected to said water collection reservoir of said first housing.

24. A water heater as claimed in claim 19 wherein said third water discharge device is connected to said second water collection reservoir in said upper chamber of said second housing.

25. A water heater as claimed in claim 2 wherein said first and further housings are elongated vertical cylindrical housings.

26. A water heater as claimed in claim 1 wherein said burner is further provided with a pilot to prevent its flame from extinguishing.

27. A water heater as claimed in claim 1 wherein said combustible gas is natural gas.

* * * * *